(12) United States Patent
Wood

(10) Patent No.: US 8,016,226 B1
(45) Date of Patent: Sep. 13, 2011

(54) VERTICAL TAKE OFF AND LANDING AIRCRAFT SYSTEM WITH ENERGY RECAPTURE TECHNOLOGY

(76) Inventor: Victor A. Wood, Palm Harbor, FL (US)

( * ) Notice: Subject to any disclaimer, the term of this patent is extended or adjusted under 35 U.S.C. 154(b) by 0 days.

(21) Appl. No.: 12/587,286

(22) Filed: Oct. 5, 2009

Related U.S. Application Data

(63) Continuation-in-part of application No. 11/827,053, filed on Jul. 10, 2007, now abandoned.

(51) Int. Cl.
*B64C 29/00* (2006.01)
(52) U.S. Cl. .................. 244/23 A; 244/23 R; 244/23 B; 244/12.4
(58) Field of Classification Search .................. 244/12.4, 244/23 A, 23 B, 17.25, 56, 66
See application file for complete search history.

(56) References Cited

U.S. PATENT DOCUMENTS

| | | | | |
|---|---|---|---|---|
| 3,061,242 | A * | 10/1962 | Zurawinski et al. | 244/23 A |
| 3,335,977 | A * | 8/1967 | Meditz | 244/12.4 |
| 5,419,514 | A * | 5/1995 | Ducan | 244/12.4 |
| 5,746,390 | A * | 5/1998 | Chiappetta | 244/12.3 |
| 6,105,901 | A * | 8/2000 | Ulanoski et al. | 244/23 A |
| 6,382,559 | B1 * | 5/2002 | Sutterfield et al. | 244/23 A |
| 6,708,920 | B2 * | 3/2004 | Fukuyama | 244/12.4 |
| 6,892,980 | B2 * | 5/2005 | Kawai | 244/12.4 |
| 2003/0080242 | A1 * | 5/2003 | Kawai | 244/12.4 |
| 2003/0106959 | A1 * | 6/2003 | Fukuyama | 244/23 R |

* cited by examiner

*Primary Examiner* — Joshua Michener
*Assistant Examiner* — Philip J Bonzell

(57) ABSTRACT

A fuselage has laterally extending wing-like structures. The wing-like structures have an aperture. A can is positioned in the aperture. The can has an axle. The axle rotatably couples the can to the aperture. The can has an upper cylindrical section and a lower rectilinear section. A multi-blade rotor is rotatably mounted in the upper section. A battery of airfoils is pivotally mounted in the lower section.

1 Claim, 3 Drawing Sheets

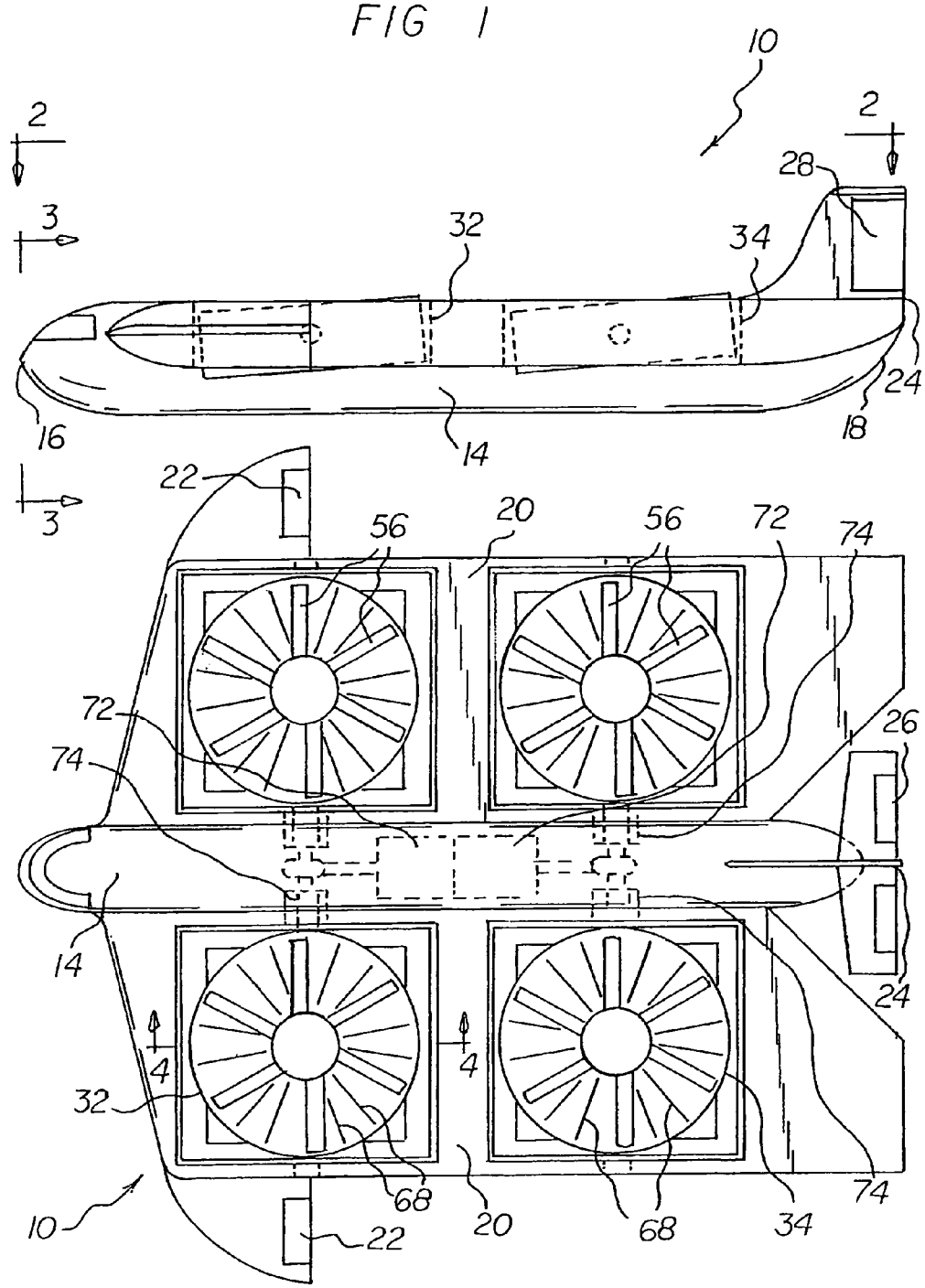

VERTICAL TAKE OFF AND LANDING AIRCRAFT SYSTEM WITH ENERGY RECAPTURE TECHNOLOGY

RELATED APPLICATION

The present invention is a continuation-in-part of pending application Ser. No. 11/827,053 filed Jul. 10, 2007 now abandoned, the subject matter of which is incorporated herein by reference.

BACKGROUND OF THE INVENTION

1. Field of the Invention

The present invention relates to a vertical take off and landing aircraft system with energy recapture technology and more particularly pertains to increasing the energy efficiency of air travel in a safe, convenient and economical manner.

2. Description of the Prior Art

The use of aircraft systems of known designs and configurations is known in the prior art. More specifically, aircraft systems of known designs and configurations previously devised and utilized for the purpose of providing take off and landing assistance to an aircraft through known methods and apparatuses are known to consist basically of familiar, expected, and obvious structural configurations, notwithstanding the myriad of designs encompassed by the crowded prior art which has been developed for the fulfillment of countless objectives and requirements.

In this respect, the vertical take off and landing aircraft system according to the present invention substantially departs from the conventional concepts and designs of the prior art, and in doing so provides an apparatus primarily developed for the purpose of increasing the energy efficiency of air travel in a safe, convenient and economical manner.

Therefore, it can be appreciated that there exists a continuing need for a new and improved vertical take off and landing aircraft system which can be used for increasing the energy efficiency of air travel in a safe, convenient and economical manner. In this regard, the present invention substantially fulfills this need.

SUMMARY OF THE INVENTION

In view of the foregoing disadvantages inherent in the known types of aircraft systems of known designs and configurations now present in the prior art, the present invention provides an improved vertical take off and landing aircraft system. As such, the general purpose of the present invention, which will be described subsequently in greater detail, is to provide a new and improved vertical take off and landing aircraft system and method which has all the advantages of the prior art and none of the disadvantages.

To attain this, the present invention essentially comprises a vertical take off and landing aircraft system. First provided is a centrally located fuselage. The fuselage has a front end. The fuselage has a rear end. The fuselage has an axial length. The axial length is provided between the front and rear ends. The fuselage is configured for the receipt of a pilot and passengers and cargo. The fuselage has laterally extending wing-like structures for life purposes. The wing-like structures have ailerons. The ailerons are provided for stability. The fuselage has a rearwardly extending empennage. The empennage has elevators. The empennage has a rudder.

A cylindrical forward aperture is provided through each wing-like structure. A cylindrical rearward aperture is provided through each wing-like structure. The apertures are of equal diameter. The apertures have parallel axes.

Provided next are cans. A can is positioned in each aperture. Each can has an exterior part. Each can has an interior part. The interior and exterior parts are joined together. The interior and exterior parts include an axle. The axle rotatably couples each can to its associated aperture. The axles each have an axis of rotation. The axes of rotation are in a common plane. The axes of rotation are transverse to the axial length of the fuselage. In this manner tipping the cans forwardly and rearwardly is allowed. Each exterior part has a curved exterior surface. The center of curvature of the exterior surface is the axis of rotation of its associated axle. In this manner unobstructed tilting is facilitated. Each interior part has an interior surface. The interior surface has an upper cylindrical section. The interior surface has a lower rectilinear section. The interior surface has an intermediate transitional section. The intermediate transitional section is provided between the upper and lower sections.

A multi-blade rotor is provided next. The rotor is rotatably mounted in the upper section of each can. In this manner rotation in a common horizontal plane is allowed when the axes of rotation of the rotors are all vertically oriented. The rotors are adapted to rotate. In this manner an airflow is created through the apertures creating thrust.

Provided next is a battery of airfoils. The airfoils are pivotally mounted in the lower section of each can. The airfoils of each can are parallel. The airfoils have free lower ends. The airfoils have upper ends. The upper ends are pivotally mounted to the lower section about parallel axes in a common plane. In this manner forward and rearward movement is allowed. The airfoils are adapted to direct the air flow from the rotors.

Further provided are guide vanes. The vanes are fixedly mounted in the transitional section of each can. The vanes of each can extend radially from the axis of rotation of its associated rotors. The vanes are adapted to control and transform the air flow.

Provided last are engines. The engines have gear boxes. The engines and gear boxes have associated drives and controls. In this manner a pilot is capable of controlling the rotation and angular orientation of the rotors with the angular orientation of the airfoils as well as the ailerons and elevators and rudder.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vertical take off and landing aircraft system which has all of the advantages of the prior art aircraft systems of known designs and configurations and none of the disadvantages.

It is another object of the present invention to provide a new and improved vertical take off and landing aircraft system which may be easily and efficiently manufactured and marketed.

It is further object of the present invention to provide a new and improved vertical take off and landing aircraft system which is of durable and reliable constructions.

An even further object of the present invention is to provide a new and improved vertical take off and landing aircraft system which is susceptible of a low cost of manufacture with regard to both materials and labor, and which accordingly is then susceptible of low prices of sale to the consuming public, thereby making such vertical take off and landing aircraft system economically available to the buying public.

Even still another object of the present invention is to provide a vertical take off and landing aircraft system for increasing the energy efficiency of air travel in a safe, convenient and economical manner.

Lastly, it is an object of the present invention to provide a new and improved vertical take off and landing energy efficient aircraft system. A fuselage has laterally extending wing-like structures. The wing-like structures have apertures. A can is positioned in each aperture. Each can has an axle. The axle rotatably couples the can to the aperture. Each can has an upper cylindrical section and a lower rectilinear section. A multi-blade rotor is rotatably mounted in each upper section. A battery of airfoils is pivotally mounted in each lower section.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a vertical take off and landing aircraft system constructed in accordance with the principles of the present invention.

FIG. 2 is a plan view of the system shown in FIG. 1 taken along line 2-2 of FIG. 1.

The same reference numerals refer to the same parts throughout the various Figures.

DESCRIPTION OF THE PREFERRED EMBODIMENT

Figure 3:
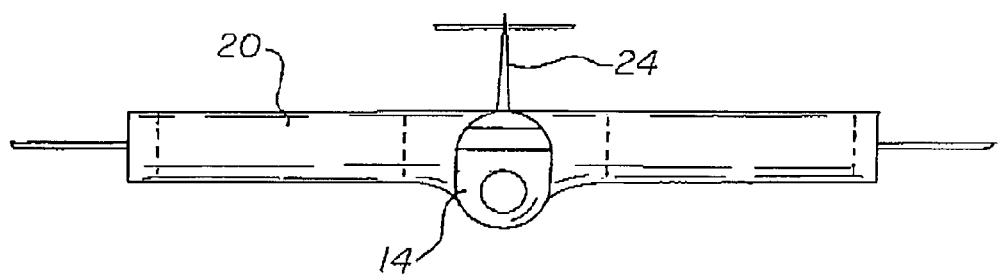
FIG. 3 is a front elevational view of the system taken along line 3-3 of FIG. 1.
Figure 4:
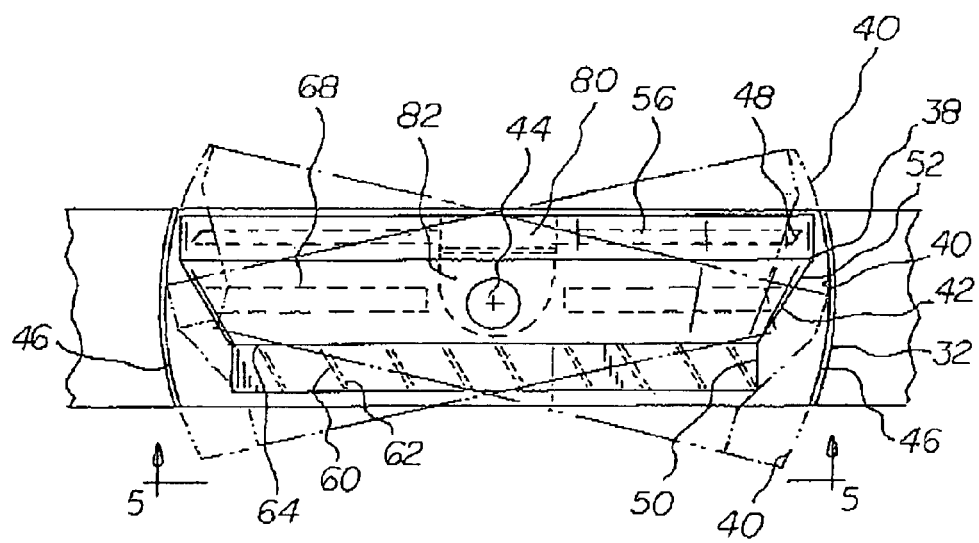
FIG. 4 is a cross sectional view taken along line 4-4 of FIG. 2.
Figure 5:
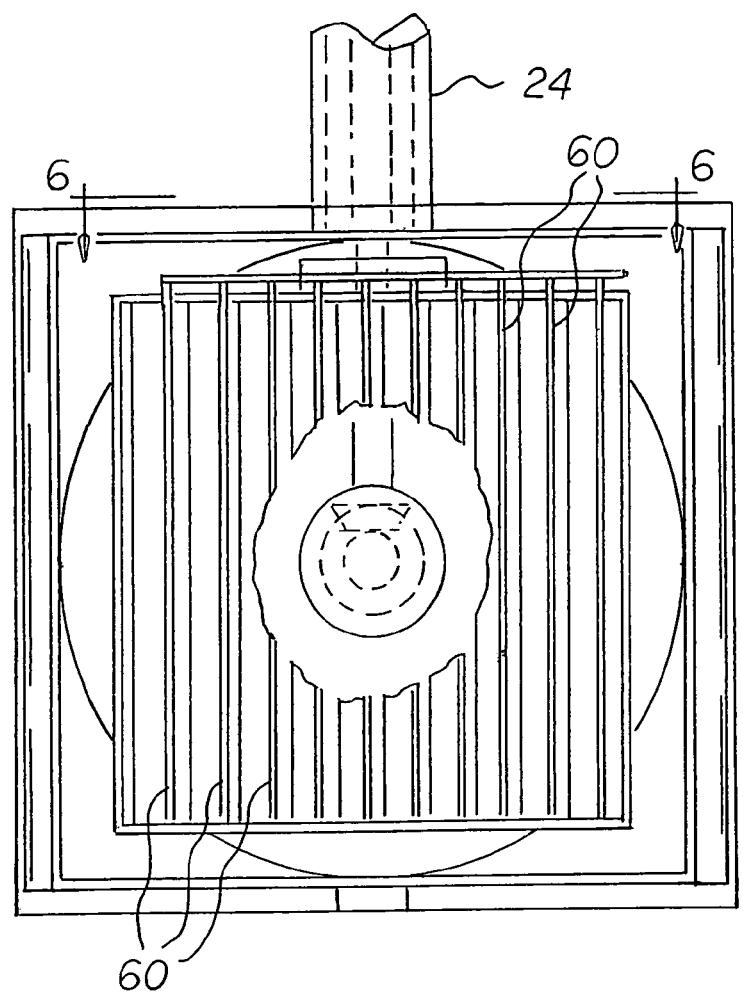
FIG. 5 is a bottom view taken along line 5-5 of FIG. 4.
Figure 6:
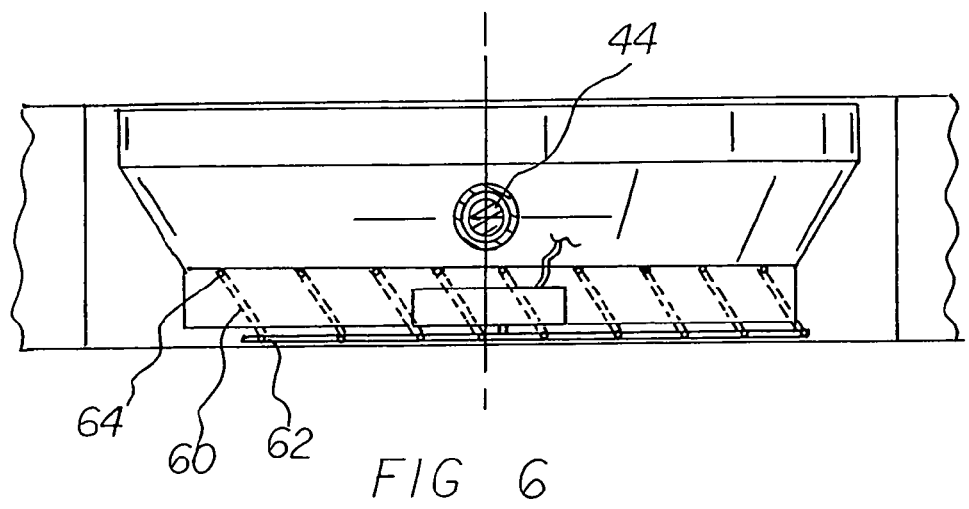
FIG. 6 is a bottom view taken along line 6-6 of FIG. 5.

With reference now to the drawings, and in particular to FIG. 1 thereof, the preferred embodiment of the new and improved vertical take off and landing aircraft system embodying the principles and concepts of the present invention and generally designated by the reference numeral 10 will be described.

The present invention, the energy efficient vertical take off and landing aircraft system 10 is comprised of a plurality of components. Such components in their broadest context include a fuselage, a can, a multi-blade rotor, a guide vane system, a disc, a cone, and a battery of airfoils. Such components are individually configured and correlated with respect to each other so as to attain the desired objective.

First provided is a centrally located fuselage 14. The fuselage has a front end 16. The fuselage has a rear end 18. The fuselage has an axial length. The axial length is provided between the front and rear ends. The fuselage is configured for the receipt of a pilot and passengers and cargo. The fuselage has laterally extending wing-like structures 20 for lift purposes. The wing-like structures have ailerons 22. The ailerons are provided for stability. The fuselage has a rearwardly extending empennage 24. The empennage has elevators 26. The empennage has a rudder 28.

A cylindrical forward aperture 32 is provided through each wing-like structure. A cylindrical rearward aperture 34 is provided through each wing-like structure. The apertures are of essentially equal circumference. The apertures have parallel axes. In an alternate embodiment, adjacent square apertures are replaced by an elongated rectangle for plural cans.

Provided next is an inner can 38. The can is positioned in each aperture. Each can has an exterior part 40. Each can has an interior part 42. The interior and exterior parts are joined together. The interior and exterior parts include an axle 44. The axle rotatably couples each can to its associated aperture. The axles each have an axis of rotation. The axes of rotation are in a common plane. The axes of rotation are transverse to the axial length of the fuselage. In this manner tipping the cans forwardly and rearwardly is allowed. Each exterior part of the can has a curved exterior surface 46. The center of curvature of the exterior surface is the axis of rotation of its associated axle. In this manner unobstructed tilting is facilitated. Each interior part has an interior surface. The interior surface has an upper cylindrical section 48. The interior surface has a lower rectilinear section 50. The interior surface has an intermediate transitional section 52. The intermediate transitional section is provided between the upper and lower sections.

A multi-blade rotor 56 is provided next. A rotor is rotatably mounted in the upper section of each can. In this manner rotation in a common horizontal plane is allowed when the axes of rotation of the rotors are all vertically oriented. The rotors are adapted to rotate. In this manner an airflow is created through the cans. Upward thrust is provided for the craft with airflow through the cans.

Provided next is a battery of airfoils 60. The airfoils are pivotally mounted in the lower section of each can. The airfoils of each can are parallel. The airfoils have free lower ends 62. The airfoils have upper ends 64. The upper ends are pivotally mounted to the lower section about parallel axes in a common plane. In this manner forward and rearward movement is allowed. The airfoils are adapted to deflect the air flow from the rotors backward or forward.

Further provided are guide vanes 68. The vanes are fixedly mounted in the transitional section of each can. The vanes of each can extend radially from the axis of rotation of its associated rotors. Each vane is in a plane containing the axis of rotation. The vanes are adapted to control or transform the air flow from the rotors to the airfoils. The air flow is changed from a swirling, somewhat turbulent air flow from the rotors into a somewhat laminar, evenly distributed flow before reaching the airfoils.

Provided next are engines 72. The engines have gear boxes 74. The gear boxes and engines have associated drives and controls. In this manner a pilot is capable of controlling the rotation and angular orientation of the rotors with the angular orientation of the airfoils as well as the ailerons and elevators and rudder.

Next provided is a disc 80. This disc is at the center of the multi-blade rotor. The disc rotates with the multi-blade rotor.

Lastly, a stationary cone 82 is provided. The stationary cone has a top located below the disc. The top is similar in size to the disc. The cone has a bottom just above the airfoils. The disc and the cone function to provide a filler intended to prevent air-flow reversal and recycling through the multi-blade rotor on rapid descent and while hovering at a low level just above ground.

The present invention is a multi-rotor vertical take-off and landing aircraft in the offing. Its most distinguishing feature is, in fact, an energy saving mechanism which extracts work from its rotor wash, energy recapture, thus providing a secondary propulsion mechanism without additional engine output. This feature more than any other, makes it stand out against all helicopter-type aircrafts which, thus far, have continually wasted an enormous amount of kinetic energy in their rotor wash, allowing it simply to dissipate into the atmosphere. The present invention will, indeed be, a superior aircraft, in terms of energy efficiency, among other things.

The present invention is an aircraft comprised of a central fuselage with four or more helicells, two on each side of the fuselage in tandem, supported in two thick wing-like structures in the primary embodiment. The cells control the flow of wash from the rotor/s, directing it through a battery of air foils to produce lift forward or backward as required. This is in addition to lift produced by the forward tilt of its rotors, the only form of forward lift that helicopters get, without additional engine output, a promise of a more fuel-efficient aircraft. The form of this aircraft will be a radical departure from any in existence today.

Each cell consists of a specialize housing called a can, within which a set of multiblade rotors spin just a little distance below the top rim. A system of guide vanes is located immediately under the rotors, followed at the lowest level by a battery of vertical air-foils. Centrally located is an engine, or a gear box, driving the rotors and connected to engines situated outside of the cells, by gears and drive-shafts. At the rear of the air craft is an empennage with elevators and rudder like conventional aircraft.

The can is a sturdy housing which is made up of an inner and an outer part. It contains and supports the items listed above. The inner part is circular at the top and its diameter is slightly larger than that of the rotors. Its specialized shape changes from circular at the top where the rotors spin, to square or rectangular at it's base where the foils are located. The area of this base section is about 10 percent less than that of circular top at the rotor. The outer part of the can provides structural integrity to the unit and bears the mechanism that permits the cell to pivot within the wing-like structures.

Since the air-flow velocity is progressively reduced along the rotor blades from the highest at the tips to the lowest at the root, the central approximately 10 percent of the rotor disc, that portion of the rotor disc which contributes very little, if any, to lift due to low rotational velocity, will be occupied by a disc. Beneath this centrally located disc within the rotor, will be a stationary cone similar in diameter to the said disc at its top and tapering to a blunt end just above the air-foils. This combination of the central disc in the rotor, and the stationary cone beneath it, provides a filler intended to prevent air-flow reversal and recycling through the rotors on rapid descent and while hovering at a low level just above ground. This is a phenomenon which has the potential for the development of undesirable vibration within the air-foil structure, not to mention, air-flow reversal is counter productive to producing lift and rotor thrust and contributes to vortex ring state, a major factor in vertical takeoff and landing crashes.

With that unit in place, the effective rotor area, that is, the area of the rotor disc minus the central "fill" area of the rotor; the area generating lift, and the rectangular or square area at the base of the can, at the level of the foils, will be equal, and should be consistently so, at any level within each cell. For practical purposes, a rotor would be somewhat rigid and limited in diameter yet it would be required to produce considerable lift and high wash flow. These factors will determine the characteristics and number of blades per rotor.

The filler component will also house an engine, or a gear box which drives the rotors. Available alternatives may possibly be, whether each cell will have its dedicated engine, or the rotors will be driven by larger on-board engines through interconnected shafting to a dedicated gear box at each rotor. At any rate if an engine were to be placed in each cell, they would all be connected by shafts and gears so that in the event of an engine failure, the rotor of that cell will continue to function effectively through the effort of the three properly functioning engines.

As mentioned, the rotors spin in the top circular part of the can some distance beneath the top rim, and as closely as safely possible to the inside periphery of the can. Immediately beneath the rotor, is a system of guide vanes intended to minimize the swirl of the wash from the rotors as well as to distribute the flow as evenly as possible before it, the wash, impinges upon the foils located in the base of the can. At the center of the guide vanes is a circular opening through which the stationary cone that houses the gearbox partially protrudes.

The foils are located at the base of the can and are capable of pivoting from their tops, or leading edges, so that they move backward or forward to provide a variable angle of attack to the on-rushing, somewhat straightened wash-flow in the same manner as the elevators on the empennage of a standard aircraft move in relation to the slipstream, deflecting air one way or the other. Just as the ailerons of an aircraft in its slipstream produce considerably increased upward lift at takeoff and landing, so too will the foils produce forward lift when pushed backward at their trailing edges, and backward lift, when pushed forward, as rotor wash is directed upon them. During hover the foils maintain a vertical, or neutral, position allowing the rotor-wash to flow by with neither backward nor forward lift.

The purpose of these foils is to extract work from wash flow by deflecting the controlled wash-flow backward or forward, thus producing forward or backward lift, a secondary propulsion system augmenting the propulsion created initially by the rotors without additional engine output. Harnessing kinetic energy from the rotor wash: energy, which hitherto had gone to waste, and continues to go to waste from helicopters, is a major feature of this new system which is based on the Newtonian explanation of lift, also referred to as the momentum transfer or air deflection explanation.

In order to change the direction of a moving object, you must apply a force to the object. It does not matter if the object is a car or a drop of fluid. Whatever applies the force that causes the object to turn must also feel that force, but in the opposite direction. As the battery of foils forces the rotor wash to change direction, the battery of foils gets pushed in the opposite direction with equal intensity.

The velocity of rotor wash flow, total area of the air foils, their angle of attack relative to the impinging wash flow, among other things, will determine the extent of lift that can be generated from this secondary propulsion system. It is worth noting that helicopters get their forward and lateral motion only from the few degrees of tilt of their rotors which accounts for just a relatively small part of their engine output and yet perform so magnificently in terms of speed. The present invention will benefit just as well from the forward tilt of its cells and will have all of that energy laden wash from which to extract work by simply manipulating the air foils backward or forward.

The rotors will be manipulated by collective controls for ascent and descent, but will not have cyclic controls with swatch plates to control its other movements in flight. The cells are pivoted at their centers, or from their rear, so that, to tilt the rotors forward or backward, the entire cell tilts appropriately. They can tilt forward for propulsion forward, or be neutral, level, to facilitate hover, or tilted backward for the craft to move backward or as a braking mechanism to reduce forward motion.

With the cells in neutral mode, i.e., with neither forward nor backward tilt, only upward lift will be produced by the rotors, and there will be no forward nor backward movement of the craft as a consequence. With that cell setting, and the air-foils set in a vertical position producing neither forward nor backward lift, the system will ascend, hover, or descend, depending on the amount of thrust being generated by the rotors. Forward or backward motion of the aircraft can be accomplished by manipulation of the air-foils backward or forward as required. While hovering, a slight increase of the pitch of the left rotors will put the craft in sideways motion to the right and vice versa.

During descent, with the cells at neutral position they provide vertical lift only, however, with the foils tilted backward they provide forward lift, and in so doing direct the wash backward allowing the craft to descend in clean air. All cells function simultaneously and to the same extent. The angle of rotor disc tilt forward, when the cell is tilted forward, can be greater than is possible in any helicopter affording potential for greater forward speeds with less susceptibility to retreating blade stall as the rotors are recessed beneath the top rim of the cans and are not in the direct path of relative wind. This feature, coupled with the close tolerance between the rotor blade tips and the interior of the can will considerably reduce if not eliminate blade-tip vortices, another possible economic factor.

Beyond a doubt, helicopters are the most, versatile of all flying machines on the planet, but they are severely limited in terms of how fast they can fly by retreating blade stall, among other things, how big they can be built and consequently, their passenger capacity. If you want a jumbo system, build it as big as you like with the appropriate number of cells and appropriately sized engines. Perhaps this is an over simplification, but it is a probability, nevertheless. The system will turn on its vertical axis while hovering, and turn in flight without the need of a tail rotor to do so. Anti-torque requirements of single post helicopters will be completely obviated and so, too, will the energy needs of tail rotors. Although the system will possess its own versatility characteristics, its main purpose is as a large capacity vertical take of and landing transport for a wide range of uses. It is intended to take many people at once safely and comfortably up, then to a new location and land safely at reasonable cost without the need for landing strips, nor the need for any form of sophisticated "stunt-like" flying at any time.

Populated areas, which due to the nature of their terrain such as somewhat hilly areas, cannot facilitate an air strip, can be served by Heliglide with a landing pad. Intercity city routes, intra state routes will be well served. As a commuter service it would be absolutely superb.

Needs for large scale evacuation and/or relief activity, as in Lebanon in July 2006, US after Katrina, after Tsunami devastation of 2004 in Indonesia and other areas after severe earthquakes as in remote areas of Afganistan, or any kind of disaster can be easily met with this craft. This list can go on and on. This system will rise to the occasion by being the mode of transport for lots of people and/or goods as needed quickly almost anywhere, probably a true life-saver.

From the foregoing, it is to be appreciated that in the present invention, the rotors are adapted to rotate to produce vertical lift when the axes of rotation of the rotors are vertically oriented and provide forward or rearward movement when the axes are tilted forward or backward by forward or backward tipping of the can. This constitutes the primary propulsion system of the present invention.

As a consequence of the above, rotor-wash, a flow of swirling somewhat turbulent, energy-laden air is generated, unusable as is for further use, since airfoils perform poorly or fail in turbulent airflow. Also, the rotor wash takes the form of a truncated cone with the point of truncation at the rotor, increasing in diameter as it travels away from the rotor. This, too, is useless to the present invention.

Two imperatives arise. First, provide a device to contain the wash so that all of it will reach the foils, hence the design of a can having a cylindrical top section in which the rotor rotates. Second, place a system of guide vanes beneath the rotor adapted to minimize swirl and turbulence of the wash, transforming it to useful "working fluid" before it impinges upon the foils.

The base of the can is appropriately formed to match the imperatively rectilinear shaped battery of foils. The guide vanes are fixedly mounted in the transitional section of the can between the cylindrical top part and the rectilinear part housing the foils.

Based on Newtonian explanation of lift, also referred to as momentum transfer or air deflection explanation, the foils deflect the "working fluid" forward or rearward and in so doing they are pushed in the opposite direction creating a secondary propulsion system increasing either, or both, the range and speed of the aircraft without increasing engine output. Thus the primary objective of the present invention, i.e. energy recapture, is attained. Energy used to provide vertical lift and lateral movement in the primary propulsion system is transferred to air causing a powerful stream of wash from which the foils extract energy creating a secondary propulsion system.

The rotor is positioned beneath the rim of the can. That, together with the minimal space between the tips of the rotor blade and the internal surface of the can obviates the formation of blade-tip vortices when the aircraft is in flight. This is another energy saving feature.

The central approximately 10 percent of the rotor-disc, which contributes very little to lift, is occupied by a disc as part of the rotor. Or, it may be a flat circular plate fixedly attached to the bottom/center of the rotor. Beneath this centrally located disc will be a stationary cone, fixedly mounted and similar in diameter to the said disc at its top and tapering to a blunt end just above the air-foils. The combination of disc and cone functions to provide a filler intended to prevent air-flow reversal and recycling through the multi-blade rotor, a cause of loud objectionable directional noises in VTOL aircrafts, as well as potential for developing undesirable vibration within the airfoil structure.

The present invention utilizes mostly conventional components configured and arranged and assembled to provide a new and useful and unobvious system with greater efficiency than previously available in vertical lift aircrafts.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vertical take off and landing aircraft system with energy recapture technology for increasing the energy efficiency of air travel in a safe, convenient and economical manner, the system comprising, in combination:
   a centrally located fuselage with a front end and a rear end and with an axial length between the front and rear ends, the fuselage being configured for the receipt of a pilot and passengers and cargo, the fuselage having laterally extending wing-like structures for lift purposes with ailerons for stability, the fuselage having a rearwardly extending empennage with elevators and a rudder;
   a cylindrical forward aperture formed through each wing-like structure and a cylindrical rearward aperture formed through each wing-like structure, the apertures being of equal diameter with parallel axes, the cylindrical forward apertures and the cylindrical rearward apertures being located in a common plane;
   a can positioned in each aperture, each can having an exterior part and an interior part, the interior and exterior parts being joined together and including an axle rotatably coupling each can to its associated aperture, the axles each having an axis of rotation in a common plane and transverse to the axial length of the fuselage for allowing tipping the cans forwardly and rearwardly, each exterior part having a curved exterior surface with its center of curvature being the axis of rotation of its associated axle to facilitate unobstructed tilting, each interior part having an interior surface with an upper cylindrical section and a lower rectilinear section with a rectangular cross sectional configuration and with an intermediate transitional section between the upper and lower sections, the lower rectangular section being formed of four rectangular faces located at four right angles with respect to each other;
   a multi-blade rotor rotatably mounted in the upper section of each can for rotation in a common horizontal plane when the axes of rotation of the rotors are all vertically oriented, each can having an upper rim and each multi-blade rotor being located beneath the upper rim of each can to abate blade tip vertices;
   a battery of airfoils pivotally mounted in the lower section of each can, the airfoils of each can being parallel with free lower ends and upper ends pivotally mounted to the lower section about parallel axes in a common plane for forward and rearward movement, all of the airfoils being mounted to remain parallel, with respect to each other throughout their entire pivotal movements;
   guide vanes fixedly mounted in the transitional section of each can, the vanes of each can extending radially from the axis of rotation of its associated rotors;
   engines with gear boxes and associated drives and controls whereby a pilot is capable of controlling the rotation and angular orientation of the rotors with the angular orientation of the airfoils as well as the ailerons and elevators and rudder;
   a cylindrical disc at the center of the multi-blade rotor rotating with the multi-blade rotor; and
   a stationary cone having a top located below the disc and similar in size to the disc, the cone having a bottom just above the air foils, the cone having a middle with an aperture receiving the axle for rotational movement of the can, the disc and the cone functioning to provide a filler intended to prevent air-flow reversal and recycling through the multi-blade rotor on rapid descent and while hovering at a low level just above ground.

* * * * *